Patented June 14, 1932

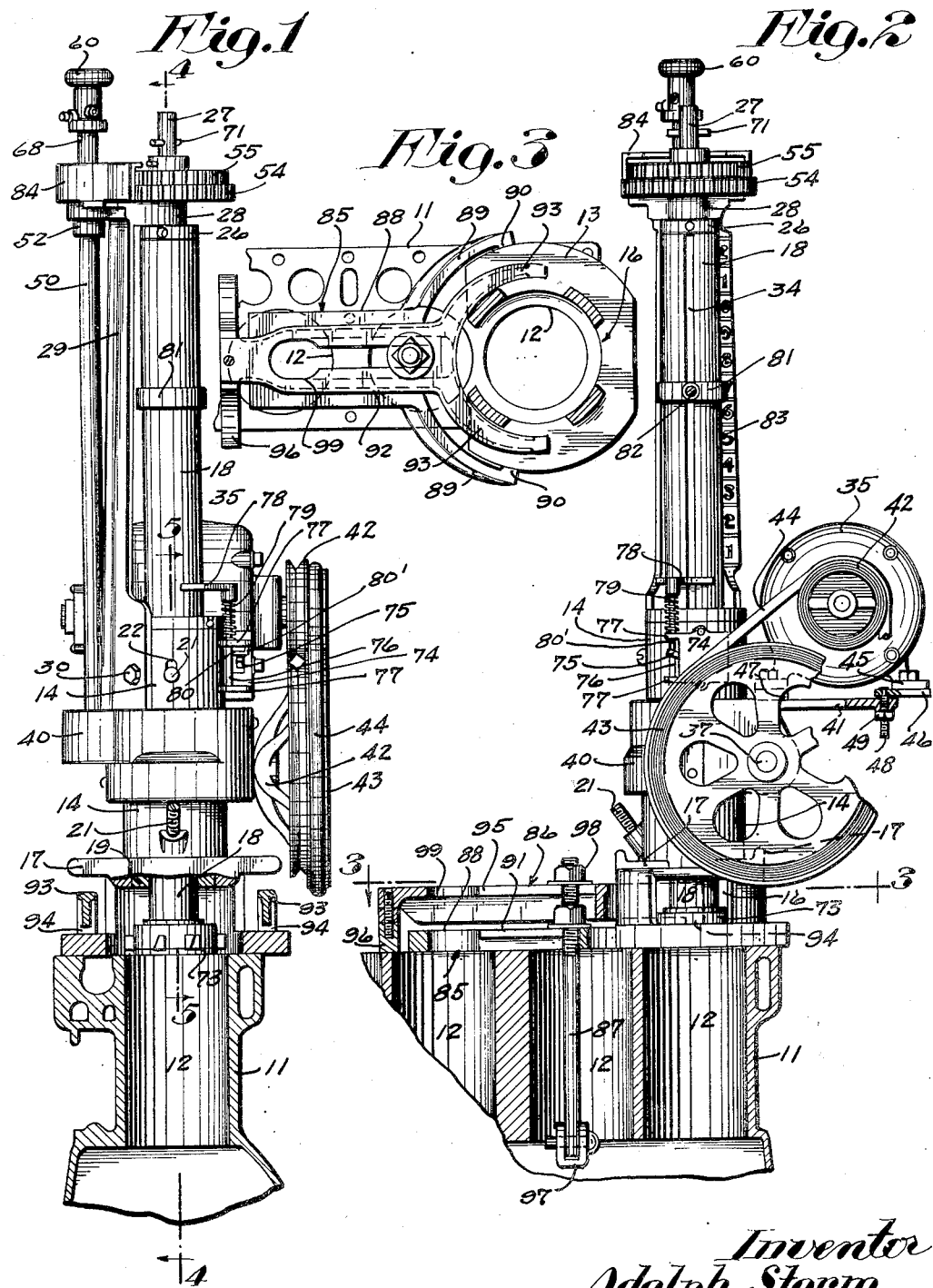

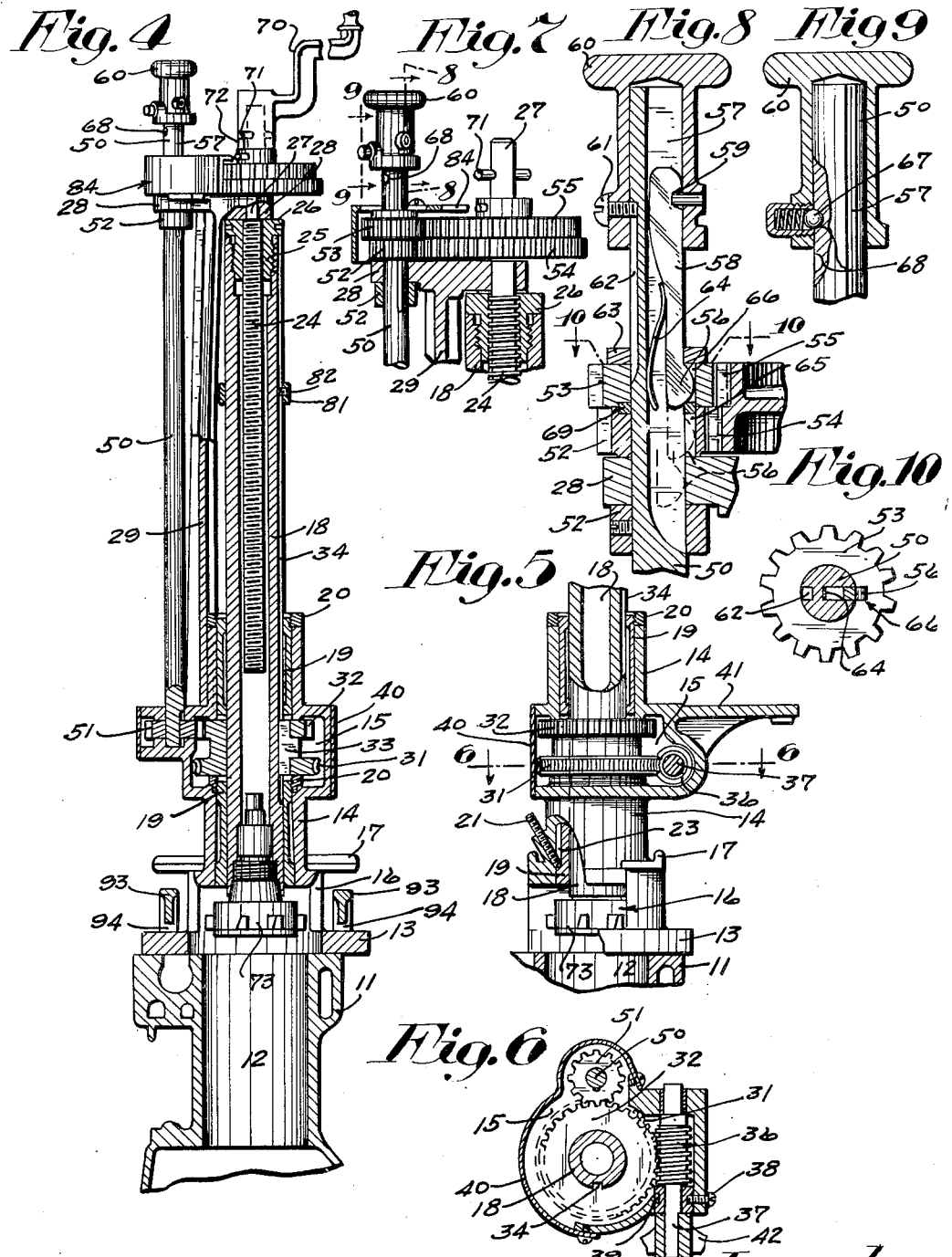

1,862,866

UNITED STATES PATENT OFFICE

ADOLPH STORM, OF MINNEAPOLIS, MINNESOTA, ASSIGNOR TO STORM MANUFACTURING CO., INC., OF MINNEAPOLIS, MINNESOTA, A CORPORATION OF MINNESOTA

BORING MACHINE

Application filed September 14, 1929. Serial No. 392,649.

My present invention has for its object the provision of a highly efficient self contained, power operated portable boring machine intended for general use but especially well adapted for re-establishing re-boring and re-finishing an entirely new bore in an engine cylinder block of accurate size and alignment.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the improved boring machine mounted on an engine cylinder block, some parts being broken away and other parts sectioned;

Fig. 2 is a right-side elevation of the improved boring machine mounted, as shown in Fig. 1;

Fig. 3 is a view partly in plan and partly in horizontal section taken on the line 3—3 of Fig. 2;

Fig. 4 is a view principally in central vertical section taken on the line 4—4 of Fig. 1;

Fig. 5 is a fragmentary view partly in side elevation and partly in central vertical section taken on the line 5—5 of Fig. 1;

Fig. 6 is a detail view partly in plan and partly in horizontal section taken on the line 6—6 of Fig. 5;

Fig. 7 is a fragmentary detail view of the transmission mechanism for the feed device, as shown in Fig. 4, on an enlarged scale;

Fig. 8 is a fragmentary detail view principally in section taken substantially on the line 8—8 of Fig. 7, on an enlarged scale;

Fig. 9 is a fragmentary detail view partly in section and taken on the line 9—9 of Fig. 7, on an enlarged scale; and Fig. 10 is a detail view with some parts sectioned on the line 10—10 of Fig. 8.

For the purpose of showing the boring machine in working position there is illustrated in the drawings a fragment of an engine cylinder block indicated as an entirety by the numeral 11 with the exception of its cylinders 12.

The numeral 13 indicates an annular base having a hollow raised central portion that is open at its top and bottom and integrally formed therewith is a cylindrical open ended housing 14 that is circumferentially expanded at its vertical center to form a gear compartment 15. Four circumferentially spaced sight openings 16 are formed in the raised central portion of the base 13, and four circumferentially spaced horizontal supporting lugs 17 are integrally formed with said central portion of the base 13 at the top thereof. To decrease the width of its base 13 from front to rear the same is diametrically flattened to prevent the same from covering too much of a cylinder adjacent to a cylinder being bored.

A long upright hollow cylindrical boring bar 18, at its lower end portion, extends axially through the housing 14 and is journaled in upper and lower axially aligned and axially spaced bearings 19. These bearings 19 are mounted in upwardly tapered seats in the housing 14, the former above the gear compartment 15 and the latter below the same. Said bearings 19 are longitudinally divided for expansion or contraction and have applied to their upper ends, upper and lower nut-acting collars 20 which engage respectively the upper end of the housing 14 and the bottom of the compartment 15 as bases of resistance. These collars 20 hold the bearings 19 adjusted in their seats so that they fit around the boring bar 18 with no clearance but with freedom to permit compound rotary and axial movement of said bar therein. The diameter of the lower bearing seat is slightly larger than the upper bearing seat to permit the upper bearing 19 to be inserted axially therethrough and into its seat.

Upper and lower set-screws 21 are provided for holding the bearings 19 from turning in their seats. The upper set-screw 21 has threaded engagement with the upper bearing 19, extends through a vertical slot 22 in the housing 14 and the lower set-screw 21 has threaded engagement with the housing 14 and projects in a vertical slot 23 in the lower bearing 19. The purpose of these slots 22 and 23 is to permit axial movement of the bearings 19 during the adjustment thereof in their tapered seats by the nut-acting collars 20.

Extending axially into the boring bar 18 from the top thereof is a long feed screw 24 which has threaded engagement with a nut-acting member 25. This nut-acting member 25 extends into the boring bar 18 from the top thereof, has internal threaded engagement therewith and is provided with an annular head 26 of approximately the same diameter as the boring bar 18 which engages the upper end of said bar as a stop. Formed with the upper end of the feed screw 24 is an axially aligned trunnion 27 journaled in a bearing head 28 integrally formed with the upper end of a post 29. This post 29 rests on the top of the gear compartment 15, is semi-circled in cross-section to fit around the left side of the housing 14 and rigidly but attachably secured thereto by screws 30.

Mounted on the boring bar 18, within the compartment 15, is a worm gear 31 and a spur gear 32 located the latter above the former. These gears 31 and 32 are integrally formed, axially spaced and float between the bearings 19 and rest on the lower nut-acting collar 20. The boring bar 18 is connected to the gears 31 and 32 to be rotated and fed axially from said gears, respectively, by a key 33 in said gears which slidably extend into a long key-way 34 in said boring bar 18. The worm gear 31 is driven from an electric motor 35 by connections which include a worm 36 the shaft 37 of which is journaled in bearings in the housing 14. One of the bearings for the worm shaft 37 is of a diameter slightly greater than the worm 36 and is removable therewith from the housing 14 to permit the mounting of the worm 36 in the compartment 15 or the removal of the same therefrom.

This bearing for the worm shaft 37 is held against axial movement by a set-screw 38 having threaded engagement with the housing 14 and projects into an annular groove 39 in said bearing. Access may be had to the gear compartment 15 through a lateral opening therein which is normally closed by a cover plate 40 for the purpose of mounting the gears 31 and 32 on the boring bar 18 or the removal of the same therefrom, for inspection, oiling and the like. The motor 35 is mounted on a shelf 41 integrally formed with the gear housing 14 and projects rearwardly therefrom.

Variable speed driving connections from the motor 35 to the worm shaft 37 includes a relatively small step pulley 42 on the shaft of said motor, and a relatively large step pulley 43 on said worm shaft and a shiftable belt 44 adapted to run in any one of the aligned grooves in said pulleys depending on the speed at which its boring bar 18 is to be driven. The motor is provided with short front and rear pairs of supporting legs 45, the former of which are bolted to the shelf 41 and the latter of which are bolted to a base plate 46 overlying said shelf. A pair of relatively thick pliable washers 47, of rubber or other suitable material, are interposed between the front pair of legs 45 and the shelf 41 and on which said front pair of legs are directly supported. Said base plate 46 is carried by a jack screw 48 having threaded engagement with the shelf 41 and held where adjusted by a lock nut 49. The connection between the base plate 46 and jack screw 48 is at the longitudinal center of said plate and said connection is such as to permit a slight wabble movement of the base plate 46 in respect to the shelf 41. Obviously, the two washers 47 and jack screw 48 afford a three point support for the motor 35. This jack screw 48 also affords a tightener for the belt 44 and may be operated to raise or lower the motor 35 in respect to the worm shaft 37 to vary the tension on said belt.

The driving connections from the spur gear 32 to the feed screw 24 include a long feed shaft 50, which extends parallel to said feed screw. This shaft 50, at its lower end, is journaled in the housing 14, extends into the gear compartment 15 and its upper end is journaled in the bearing head 28. Keyed to the lower end of the feed shaft 50 is a spur pinion 51 which meshes with the spur gear 32. Applied to the feed shaft 50 is a collar 52 arranged to engage the underside of the bearing head 48 to prevent endwise lifting movement of said feed shaft.

A novel variable speed transmission mechanism is provided for connecting the feed shaft 50 to the feed screw 24. This transmission mechanism includes a pair of differential spur pinions 52—53, loosely mounted on the feed shaft 50 in respect to each other and mesh, respectively, with a pair of connected spur gears 54—55 keyed to the trunnion 27 on the feed screw 24. The ratio of the pinion 52 and gear 54 is such as to drive the feed screw 24 at a relatively slow speed, and the ratio of the pinion 53 and gear 55 is such as to drive said screw at a relatively high speed. A sliding key 56 is mounted in a key-way 57 in the feed shaft 50 and movable from neutral position to a position in which it connects either one of the pinions 52—53 to the feed shaft 50. This key 56 has a long body member 58 which lies entirely within the key-way 57 and is loosely hinged at 59 to a key shifting hand piece 60. Said hand piece 60 is telescoped onto the upper end of the feed shaft 50 for axial sliding movement and is held from turning on said shaft by a key 61 in the form of a screw having threaded engagement with the hand piece 60 and extends into a key-way 62 in the feed shaft 50. The pinions 52—53 are held against axial movement on the feed shaft 50 by the bearing head 28 on which they are supported and an overlying fixed collar 63 on said shaft. This collar 63 also surrounds the key body 58 and holds the same against movement outward of the feed shaft 50.

A leaf spring 64, attached to the back of the key body 58, engages the feed screw 50 in the bottom of the key-way 57 and is under strain to yieldingly hold the key body 58 against the collar 63 with the key 56 in an operative position, in which it extends outward of said shaft. The collar 63 further acts as a stop to limit the telescoping movement of the hand piece 60 onto the feed shaft 50 and positions the key 56 in a neutral position, as indicated by dashes in Fig. 8.

During the telescoping movement of the hand piece 60 onto the feed shaft 50 when moving the key 56 to a neutral position, it engages the bearing head 28 and is cammed thereby into said key-way against the tension of the spring 64. When moving the key 56 from neutral position into its dash and dot position, the same is projected into a key-way 65 in the pinion 52 and thereby connects said pinion to the feed shaft 50 and drives the feed screw 24 at its slow speed.

The extreme upward movement of the hand piece 60 is limited by the engagement of the key 56 with the stop collar 63, as shown by full lines in Fig. 8, and in which position the spring 64 holds said key in a key-way 66 in the pinion 53 and thereby connects said pinion to the feed screws 24 and drives the same at its high speed. A spring pressed friction ball 67 and co-operating longitudinally spaced seats 68 in the feed shaft 50 hold the hand piece 60 with the key 56 in either key-way 65 or 66. Interposed between the pinions 52—53 is a cam acting collar 69 with which the key 56 engages during its movement from the key-way 65 to the key-way 66 or vice versa. The purpose of this cam acting collar 69 is to completely cam the key 56 out of the key-way in which it extends before the same is permitted to be projected by the spring 64 into the other key-way. Obviously, by manipulating the hand piece 60 the key 56 may be very quickly shifted to connect either one of the pinions 52—53 to the feed shaft 50 or to be set in neutral position.

When the key 56 is moved from the key-way 65 to neutral position it engages the bearing head 28 and is cammed thereby out of said key-way into the key-way 57 and held in this position by said bearing head.

In the drawings the boring bar 18 is shown in its retracted or uppermost position in which the head of the nut-acting member 25 engages the bearing head 28 as a stop. Downward feeding movement is imparted to the boring bar 18 during its rotary movement by the worm gear 31 from the motor 35 by moving the hand piece 60 from neutral position to connect either one of the pinions 52—53 to the feed shaft 50 depending on the speed at which it is desired to drive the boring bar 18. At the completion of the projecting movement of the boring bar 18 by the feed screw 24, said boring bar is retracted by turning the feed screw 24 backward by means of a hand crank 70 detachably applied to the trunnions 27, as indicated by broken lines in Fig. 4. Said hand crank 70 is connected to the trunnion 27 by a transverse pin 71 in said trunnion and lock notches 72 in the hub of the said hand crank. This hand crank 70 also serves another important function in that it may be used to hold the feed screw 24 from turning during the rotation of the boring bar 18 by the worm gear 31 and thus impart a direct feeding movement to said boring bar. During this direct feeding movement of the boring bar 18 by the stationary feed screw 24, the key 56 must of course be in neutral position.

A multiple cutter head 73 is detachably secured by screw threads in the lower end of the boring bar 18 and which head is adjustable to bore a cylinder to the desired diameter.

By means of the hand crank 70 the feed screw 24 may be operated to adjust the cutter head 73 or other tool substituted therefore to properly position the same in respect to the top of the cylinder block 11. During the adjustment of the cutter head 73, the same may be watched through the sight openings 17.

As shown in the drawings, the improved boring machine is mounted directly on the top of the cylinder block 11, and the underside of its base 13 is finished smooth in the plane that intersects the axis of the boring bar 18 at right angles so that the axis of a reboring cylinder will be perpendicular to the top of said block.

To automatically stop the boring bar 18 at the completion of the re-boring of a cylinder, there is interposed in the circuit of the motor 35 a tumbler switch 74 mounted on the housing 14 above the gear chamber 15. This switch 74 is arranged to be closed by an upward movement of its finger piece 75 and opened by a downward movement thereof. Said switch 74 is manually closed by lifting its finger piece 75 to start the motor 35 and thereafter automatically operated to stop said motor by the following connections, to wit an upright plunger 76 is slidably mounted in bearing lugs 77 on the casing of the switch 74 and provided at its upper end with a head 78 which fits circumferentially around the boring bar 18 to hold said plunger from turning about its axis. A coiled spring 79 encircling the plunger 76 is compressed between the upper bearing lug 77 and head 78 to normally hold said plunger and its head raised. Secured to the plunger 76 between the bearing lugs 77 is a radially projected finger 80 which extends transversely over the switch finger piece 75. The outer end portion of the finger 80 is turned upward to afford a stop 80' arranged to engage the upper bearing lug 77 and limit the lifting movement of the plunger 76 by its spring 79. By depressing the plunger 76, its finger 79 engages the switch finger piece 75 and moves the same downward to open the switch 74. Cooperating with the plunger head 78 is a striking collar 81 on the boring bar 18 which is rigidly secured thereto in different vertical adjustments by a set-screw 82 that extends into the key-way 34 and impinges against said bar. This collar 81 is arranged to engage the head 78 at the completion of the re-boring of a cylinder, depressed plunger 76 and thereby opens the switch 74. Said collar 81 may be readily adjusted by means of its set-screw 82 when boring cylinders of different lengths.

To facilitate the adjustment of the collar 81 on the boring bar 18 for cylinders of different lengths there is cast on the post 29 a scale 83 representing inches.

Detachably secured to the bearing head 28 is a guard 84 for the pinions 52—53 and gears 54—55. The boring machine, when mounted on the top of the engine block 11, is centered in respect to the cylinder 12 to be re-bored by a positioning gauge 85 and rigidly secured by a clamp 86 to said block. A single anchor bolt 87 is provided for frictionally clamping the gauge 85 in position on the top of the cylinder block 11 and for frictionally securing the clamp 86 on said block and the base 13 of the boring machine. The gauge, as shown, comprises a shank 88 having a pair of diverging arms 89 on the ends of which are short inturned contact lugs 90 which are less than 160° apart and arranged to be engaged by the annular base 13 to center the boring machine in respect to the cylinder to be re-bored. Formed in the gauge shank 88 is a longitudinally extended slot 91, through which the anchor bolt 87 extends.

It may be here stated that a novel centering device and template, not shown, are provided for positioning the gauge 85 on the cylinder block 11 and which centering device and template are disclosed and broadly claimed in my pending application filed April 7, 1928 under S. N. 268,178 entitled "Centering device for a boring machine".

The clamp 86 comprises a shank 92 having a pair of diverging arms 93 arranged to overlie the base 13 and provided, at their ends, with a pair of downwardly extended bearing lugs 94, which directly engage said base at diametrically opposite points outward of the raised central portion thereof. A longitudinally extended slot 95 is formed in the shank 92 through which the anchor bolt 87 extends. On the rear end of the shank 92 is a transverse bearing bar 96, which rests on the top of the cylinder block 11.

The anchor bolt 87 is provided with a pivoted crosshead 97 arranged to be turned into a position substantially parallel to said bolt for insertion through one of the cylinders 12 and then turned into a horizontal or transverse position to engage the underside of the cylinder block 11 at diametrically opposite points. Upper and lower nuts and washers 98 are applied to the upper end of the anchor bolt 87 and rest, respectively, on the upper surfaces of the shanks 88 and 92 with a variable pressure to hold the gauge 85 and clamp 86 in position. The slot 95 is expanded at 99 for the passage of the upper nut and washer 88 therethrough to permit the application of the clamp 86 to the bolt 87 or the removal of the same therefrom without removing said nuts and washer from the anchor bolt 87.

From the above description, it is evident that after the boring machine has been centered on the cylinder block and the cutter head 73 adjusted to re-bore one of the cylinders 12 to the desired diameter, it is only necessary for the operator to lift the switch finger piece 75 to start the motor 35 and manipulate the hand piece 60 to connect either one of the pinions 52—53 to the feed shaft 50 and thereby complete the transmission mechanism to the feed screw 24 from the boring bar 18. During this movement of the hand piece 60, the key 56 will be slid from neutral into one of the pinions 52—53 and then automatically project the key-way therein under the action of the spring 64 when the key-way 57 is brought into alignment with the key-way in the respective pinion under the rotation of the feed shaft 50. No further attention need be given the operation of the boring machine as the same will be cut out of action at the completion of the re-boring of the cylinder by the engagement of the striking collar 81 with the plunger head 78 to thereby open the switch 74, as previously described.

What I claim is:

1. A machine of the class described comprising a housing having a supporting base, upper and lower axially aligned and axially spaced split conical bearings adjustably mounted in the housing, said housing being of increased diameter between the bearings to provide a gear compartment, a tubular boring bar mounted in the bearings for compound rotary and axial movements, a nut threaded on each split bearing to shift it axially and to thereby center the bar within the housing, a post mounted on the gear compartment of the housing, a bearing head on the post axially aligned with said bearings and axially spaced above the housing, a feed screw extending axially into the boring bar from the top thereof and journaled at its upper end in the bearing head and held therein against axial movement, a nut-acting member on the feed screw and fixed in the upper end of the boring bar, a feed shaft journaled at its lower end in a bearing on the housing and extending into the gear compartment and at its upper end in a bearing on the post, a worm gear in the gear housing keyed to the boring bar with freedom to permit the boring bar to move axially therethrough, an electric motor mounted on the gear compartment, a worm journaled in bearings in said compartment and meshing with the worm gear, a pulley on the worm, a second pulley on the rotor of the motor, a belt arranged to run over said two pulleys, driving connections from the worm gear to the feed shaft within said compartment, and other driving connections from the feed shaft to the feed screw.

2. A machine of the class described comprising a housing having a supporting base, upper and lower axially aligned and axially spaced split conical bearings adjustably mounted in the housing, said housing also having a gear compartment between said bearings, a tubular boring bar mounted in the bearings for compound rotary and axial movements, a nut threaded on each split bearing to shift it axially and to thereby center the bar within the housing, a fixed post on the housing and extending adjacent one side of the boring bar, a bearing head on the post axially aligned with said bearings and axially spaced above the housing, a feed screw extending axially into the boring bar from the top thereof and journaled at its upper end in the bearing head and held therein against axial movement, a nut-acting member on the feed screw and fixed in the upper end of the boring bar, a feed shaft journaled at its lower end in a bearing on the housing and at its upper end in a bearing on the post, a worm gear in the gear housing keyed to the boring bar with freedom to permit the boring bar to move axially therethrough, means for rotating the boring bar, a gear keyed to the feed shaft and meshing with the worm gear on the boring bar, two inter-meshing gears, one of which is loose on the feed shaft and the other of which is keyed to the feed screw, a clutch for connecting the loose gear to the feed shaft, a vertical scale on the post, a worm and an electric motor connected to the worm to drive the worm gear and rotate the boring bar, a pointer on the boring bar for cooperation with the scale, and a switch in the motor circuit and adapted to be operated by said pointer to stop the machine at a predetermined depth.

In testimony whereof I affix my signature.

ADOLPH STORM.